March 31, 1931.  A. ROITZHEIM ET AL  1,798,986
PROCESS OF AND APPARATUS FOR OBTAINING METALLIC ZINC
Filed April 23, 1927
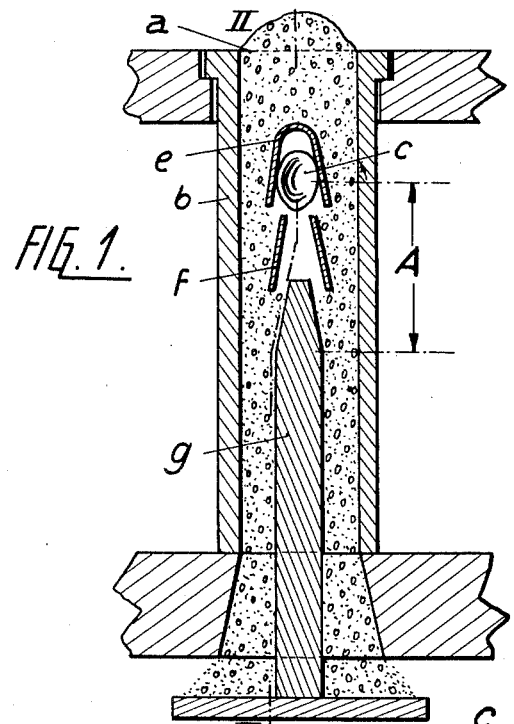
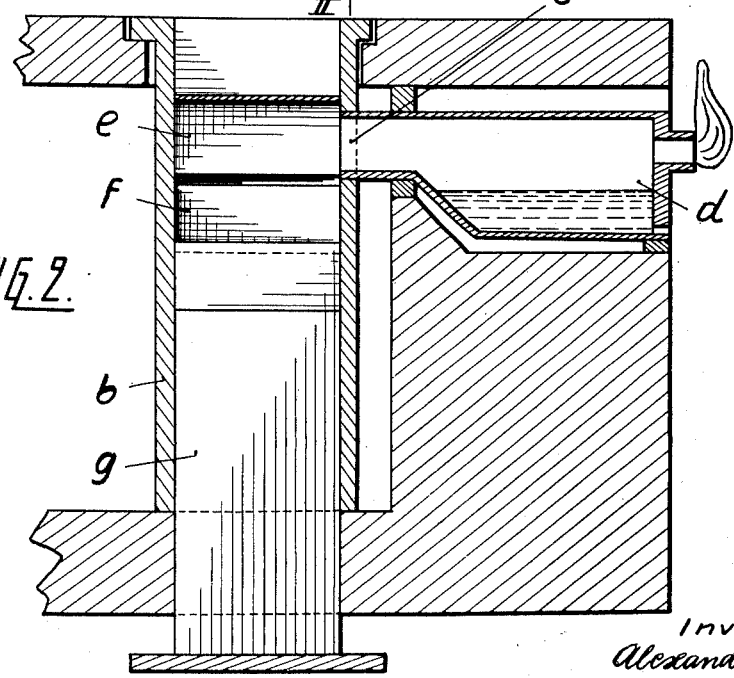
Inventors:
Alexander Roitzheim
and Wilhelm Remy
by [signature]
Atty.

Patented Mar. 31, 1931

1,798,986

UNITED STATES PATENT OFFICE

ALEXANDER ROITZHEIM AND WILHELM REMY, OF BERLIN-OBERSCHONEWEIDE, GERMANY

PROCESS OF AND APPARATUS FOR OBTAINING METALLIC ZINC

Application filed April 23, 1927, Serial No. 186,100, and in Germany April 28, 1926.

Our invention relates to a process of treating zinc ores and other zinciferous material to recover metallic zinc. The recovery of zinc by treating zinciferous material in externally heated retorts, shaft furnaces or the like involves the drawback that the consumption of fuel per unit of zinc obtained is considerable as the charge is heated through the walls of the furnace which are poor heat conductors.

It has often been attempted to reduce the fuel consumption in such furnaces by introducing into the charge a small percentage of concentrated oxygen or air oxygen, so that a certain percentage of the reducing carbon admixed to the zinc ore is consumed. In this manner very high temperatures may be obtained with very low consumption of fuel as obviously the concentration of heat within the closed and externally heated furnace is very high. For instance, in a vertical retort which is heated externally to about 1000° C., a very small quantity of air introduced at the bottom of the charge suffices to obtain temperatures of the order of 1500° C. without difficulty.

The internal combustion is favored by the chimney like action of the retort which generates a reduction of pressure at the bottom. The reduction is only slight but sufficient for the small quantities of air required, the more so as a certain permeability may be imparted to the charge by selecting comparatively coarse lumps.

The problem of internal heating is very simple from a thermic point of view but extremely difficult in practice on account of the presence of finely subdivided zinc oxide in the reduction gases, which greatly interferes with the condensation of the zinc vapor. If a small quantity of oxygen, for instance in the form of air, is admitted into the bottom opening of a vertical retort, $CO_2$ is formed by combustion. However this carbon dioxide is not stable, for the gases are also laden with zinc vapor, and carbon dioxide and zinc vapor are known to react with each other instantaneously according to the equation:

$$CO_2 + Zn = ZnO + CO.$$

The carbon dioxide thus disappears immediately, being replaced by carbon monoxide, while the metallic zinc, which has reacted with the carbon dioxide, is converted into highly disperse zinc oxide. As only that quantity of air or oxygen is admitted into the retort, which suffices to increase the high temperature of the charge by about 100° or 200° C., only a very small fraction of the zinc vapor developed in the retort is oxidized in this manner. However the small quantity of zinc oxide formed at the bottom of the retort suffices to prevent the zinc vapor which has entered the condenser from condensing into molten zinc. It is an established fact that dust in the atmosphere favors the formation of mist by preventing the condensation of the moisture into rain. A similar action will be exerted by the finely distributed zinc oxide on the zinc vapor in the condenser, the vapor condensing for the major part into blue powder and the small percentage of liquid zinc which does form being objectionable physically as it includes zinc oxide.

To the non-initiated it would appear advisable to reconvert the zinc oxide thus formed into metallic zinc by reduction in contact with the incandescent carbon, and all inventors, who hitherto attacked this problem, have tried to get rid of the zinc oxide in this manner. Unfortunately this chemical reaction does not lead to success for the simple reason that the velocity of this chemical reaction is less than the velocity at which the reduction gases rise in the charge in contact with the carbon, so that the zinc oxide cannot be kept in contact with the incandescent carbon during a sufficiently long period of time.

In contradistinction to the chemical method, which has hitherto been followed without leading to a success, the present invention contemplates the removal of the highly disperse zinc oxide by purely physical means. We have ascertained that owing to the high temperature, at which the zinc oxide forms in the retort, it is present in the gases under the form of vapor. Obviously this vapor can be condensed in contact with bodies, which are held at a temperature below the temperature of vaporization of the zinc oxide. Fortunately now the temperature, at which zinc oxide vapor condenses, is some hundred degrees C. higher than the temperature of condensation of zinc metal vapor. We make use of this fact by separating the zinc oxide formed in the retort from the zinc vapor by fractional condensation.

The separation is facilitated by the fact mentioned above that the zinc oxide which, together with carbon monoxide and zinc vapor, is formed in the lowest part of the retort in the region where the reduction carbon is oxidized by the oxygen supplied, has a high degree of dispersion and in consequence of this very fine distribution a certain percentage of this zinc oxide is reduced in contact with the white-hot carbonaceous charge, and the remainder is partly vaporized at this high temperature. This remainder of zinc oxide vapor, however, is only stable at high temperatures, and at a temperature between 900 and 1000° C. it will condense into amber-colored bodies which show mineral texture after cooling. These bodies are compact lumps or delicate needles of zinc oxide which are irregularly arranged and, on account of their large surface, assist in binding further quantities of condensed zinc oxide.

In performing our process we collect the zinc oxide vapors in a condenser having a temperature of 900 to 1000° C. and in which the zinc oxide vapors are completely condensed whereupon the pure zinc vapors and the reduction gases are conducted into a zinc condenser having a temperature of about 500 to 850° C. where the zinc vapors are condensed to liquid zinc.

It is obvious that the condensation of the zinc oxide vapors at 900–1000° C. requires a larger condensation surface in order to separate the zinc oxide completely from the gas and therefore this condenser is preferably formed with many passages. The passages in this condenser are liable to be gradually clogged by the condensed zinc oxide and therefore the substance in which these passages are formed must be constantly renewed.

We prefer effecting the condensation of the zinc oxide in that zone of the charge in the retort, in which the charge has a temperature ranging between 900 and 1000° C.

Obviously if the furnace is charged continuously or in short intervals, the charge will keep moving (descending) in the retort and comparatively cool portions of fresh charge will continuously travel across the zone of condensation, in which the required temperature of 900–1000° C. prevails. Thus the moving charge itself is relied upon to condense the zinc oxide vapor, which has formed in the bottom part of the retort by the interaction of the carbon dioxide—formed by the combustion of some of the carbon with the small quantity of air or other oxygen admitted into the retort—with the zinc resulting in the reduction of the raw material. The gases laden with the zinc metal vapor are removed through a canal leading from the zone of condensation to the condenser proper.

In the drawings affixed to this specification and forming part thereof a vertical furnace for continuous operation is illustrated diagrammatically by way of example.

In the drawings

Fig. 1 is a vertical section of the furnace, and

Fig. 2 is a section on the line II—II in Fig. 1.

Referring to the drawings, $b$ is the vertical retort and $a$ is the throat of the retort where fresh cold charge is continuously supplied, while the residue is continuously removed at the base of the retort so that the retort is permanently traversed by the descending charge. Obviously, the charge is cold at the top and becomes gradually heated on its downward travel, the maximum temperature being reached at the bottom. In the region indicated by the arrows A in Fig. 1 where the temperature is within the range of 900–1000° C., the reduction gases with the vaporized zinc oxide and zinc metal contained therein, are intercepted by a conduit $e$ open at the bottom which may have a cross section resembling an inverted V and pass over into the condenser $d$ through a passage $c$. In this zone of comparatively low temperature the zinc oxide is condensed and the zinc metal vapor moves on to the condenser $d$ with the reduction gases. Deflectors $f$ may be provided below the conduit $e$ in order to prevent clogging of the passage $c$ and to facilitate the separation of the vapor from the charge. The usual partition $g$ is inserted in the lower part of the furnace to make up for the gradually decreasing volume of the charge.

We wish it to be understood that we do not desire to be limited to the exact details of construction shown and described for obvious modifications will occur to a person skilled in the art.

We claim:—

1. The process of producing metallic zinc comprising heating a charge of zinciferous material and a reducing agent by applying heat on the outside, admitting a small quantity of oxygen into the charge to increase the temperature within the charge, whereby a small quantity of carbon dioxide and—by chemical reaction of this gas with some of the zinc metal vapor resulting in the reduction of the zinciferous material—some zinc oxide in the vapor phase is formed, and separating the zinc oxide from the zinc metal vapor before the zinc metal vapor is condensed.

2. The process of producing metallic zinc comprising heating a charge of zinciferous material and a reducing agent by applying heat on the outside, admitting a small quantity of oxygen into the charge to increase the temperature within the charge, whereby a small quantity of carbon dioxide and—by chemical reaction of this gas with some of the zinc metal vapor resulting in the reduction of the zinciferous material—some zinc oxide in the vapor phase is formed, and separating this zinc oxide from the zinc metal vapor by fractional condensation.

3. The process of producing metallic zinc comprising heating a charge of zinciferous material and a reducing agent by applying heat on the outside, admitting a small quantity of oxygen into the charge to increase the temperature within the charge, whereby a small quantity of carbon dioxide and—by chemical reaction of this gas with some of the zinc metal vapor resulting in the reduction of the zinciferous material—some zinc oxide in the vapor phase is formed, and causing this zinc oxide to be condensed in contact with that part of the charge in the retort, whose temperature is below the vaporization temperature of zinc oxide.

4. The process of producing metallic zinc comprising heating a charge of zinciferous material and a reducing agent by applying heat on the outside, admitting a small quantity of oxygen into the charge to increase the temperature within the charge, whereby a small quantity of carbon dioxide and—by chemical reaction of this gas with some of the zinc metal vapor resulting in the reduction of the zinciferous material—some zinc oxide in the vapor phase is formed, and causing this zinc oxide to be condensed in contact with that part of the charge, in which a temperature ranging between 900 and 1000° C. prevails.

5. The process of producing metallic zinc comprising heating a charge of zinciferous material and a reducing agent by applying heat on the outside, admitting a small quantity of oxygen into the charge to increase the temperature within the charge, whereby a small quantity of carbon dioxide and—by chemical reaction of this gas with some of the zinc metal vapor resulting in the reduction of the zinciferous material—some zinc oxide in the vapor phase is formed, causing this zinc oxide to be condensed in contact with that part of the charge, in which a temperature ranging between 900 and 1000° C. prevails, and causing the reduction gases and the zinc metal vapor to escape from this zone and the zinc metal to be condensed separately.

6. In the production of metallic zinc from zinciferous material by reduction the steps of heating a mixture of such material and a reducing agent, admitting some air into the mixture to raise the temperature therein, causing the vapors of zinc oxide formed in the mixture by chemical reaction to be condensed in contact with parts of the mixture which have a temperature below the vaporization temperature of the zinc oxide and causing the zinc metal vapor to be removed from the mixture and condensed separately.

In testimony whereof we affix our signatures.

ALEXANDER ROITZHEIM.
WILHELM REMY.